United States Patent [19]

Dornbusch

[11] Patent Number: 5,232,223
[45] Date of Patent: Aug. 3, 1993

[54] ELECTRONIC GAME CONTROLLER

[76] Inventor: Larry Dornbusch, 22W131 Glen Park, Glen Ellyn, Ill. 60137

[21] Appl. No.: 856,576

[22] Filed: Mar. 24, 1992

[51] Int. Cl.⁵ .......................... A63F 9/22; A01K 97/00
[52] U.S. Cl. ............................ 273/148 B; 273/438; 43/4
[58] Field of Search .................. 273/148 B, 438; 340/709; 43/1, 4, 18.1, 17

[56] References Cited

U.S. PATENT DOCUMENTS

| | | | |
|---|---|---|---|
| 4,630,817 | 12/1986 | Buckley | 273/438 X |
| 4,695,953 | 9/1987 | Blair et al. | 364/410 |
| 4,925,189 | 5/1990 | Braeunig | 273/148 B |
| 5,131,165 | 7/1992 | Benson | 43/4 X |

*Primary Examiner*—V. Millin
*Assistant Examiner*—Raleigh W. Chiu
*Attorney, Agent, or Firm*—Fitch, Even, Tabin & Flannery

[57] ABSTRACT

An electronic game controller enables a game player to play a fishing game and to control an electronic game device. The electronic game controller resembles an actual rod and reel. The reel includes an electronic circuit for sensing pushbutton switches which are depressed by the game player during game play and for sensing position sensing switches which are activated by the position in which the game controller is held. The reel also includes a crank which controls the switching of an optical switch. These features provide an electronic game controller which responds to actual fishing movements typically made during an actual fishing episode such as casting the line and reeling in the line in various directions to avoid natural obstacles.

18 Claims, 5 Drawing Sheets

ELECTRONIC GAME CONTROLLER

FIELD OF THE INVENTION

The present invention relates to an electronic game controller responsive to the movements of a game player during game play. The electronic game controller responds to actual motion which mimics real motion typically occurring during the performance of a corresponding real event being simulated by the game play. In particular, the present invention relates to an electronic game controller for controlling the operation of a fishing game. The controller resembles an actual rod and reel and permits the game player to interact with the controller and the game as if the game player were actually fishing.

BACKGROUND OF THE INVENTION

Many electronic game devices consist of a microprocessor or dedicated integrated circuit based system for controlling the generation of a video signal for display on a television screen, video display terminal or other display device. Many of these games mimic real-life events, for instance, flying a jet airplane or driving a race car. These games require the game player to interact with the game in real time. That is, the game player must respond to the game action as it is being displayed. This interaction in real time is intended to give the game player the same feeling as he would experience if he were participating in the real-life event.

The electronic game device is operated by an electronic game controller. The electronic game controller typically includes a number of pushbutton switches which, when depressed, send electronic signals over a cable connecting the controller to the game device for playing the selected game. The operator pushes these buttons to, among other things, select a game, to start a game, and to control a game piece being manipulated which can include a person, a race car or a jet airplane. Some game controllers include joysticks or steering wheel devices which attempt to give the game player a more realistic experience.

One type of game controller produced by Nintendo of America, Inc. (Nintendo) consists of a rectangular box having a cable for connecting to the game device and a select button for selecting one of many offered selections, a start button, an A button, a B button, and a control pad for controlling the motion of the game piece in either left, right, up or down directions, each of which are activated by finger pressure alone. As an example, one type of game controlled by this type of game controller is a fishing game in which the game player tries to catch fish from a number of different lakes. The lakes include natural hazards such as weed beds which must be avoided just as in actual fishing. The start button allows the game player to start the game. Once the game is started, a menu of selections is presented on the screen which includes Select Lure, Move Boat, Cast and End. The game player selects one of these functions by pressing the control pad until a cursor is positioned opposite the desired selection. Once the cursor is in place, the A button is pressed to complete the selection.

One aspect of the fishing game involves the ability to control the direction of the lure when presented to the fish. The fishing lure can be made to travel back and forth in a presentation mode which makes the lure more attractive to the fish. This is done by alternately pressing the control pad on opposite sides so that the lure travels back and forth (or left to right) thereby attracting the fish. While the motion of the lure corresponds essentially to the motion of a real artificial lure during a fishing episode, the alternate depression of the control pad does not correspond to any motion made during actual fishing. In a real situation, the fisherman will alternately move the fishing rod from side to side to create a similar motion of the lure.

Another aspect of the fishing game is the ability to reel in the fish once the fish has been hooked. To reel in the fish with the prior art game controller, the game player must depress the A button. The game player releases the button when the tension becomes too great on the line, as signaled by an alert tone resembling a ringing bell. At this time, the A button is released until the bell stops ringing. Once the bell has stopped ringing, the A button is pushed again to continue reeling in the fish. As before, this motion does not correspond to any real motion undertaken by a fisherman during the reeling in of a fish. As is well known, to reel in a fish, the fisherman turns a crank mounted on the side of the reel which pulls the fishing line into the reel and winds the fishing line around a spool. When line tension becomes too great, the fisherman stops turning the crank.

As can be seen, the realism of the fishing game is substantially diminished by use of pushbuttons on a box controller. What is needed is a game controller which more accurately recreates the experience of fishing with a hook, line and sinker.

SUMMARY OF THE INVENTION

The present invention is an electronic game controller which is used with a fishing game. The electronic game controller greatly improves the playability of the game by providing a controller which responds to actual motion of the game player. The game player mimics the actual motion a fisherman would use when fishing. For instance, in a real fishing situation, the fisherman casts an artificial lure or other bait by casting fishing line with a rod and a reel. The cast is made by bringing the rod back to or over the shoulder and then bringing the rod forward to throw the lure. At a certain point in the forward motion of the rod, the fisherman throws the lure by using a casting button which causes the lure to travel for a certain distance. Once the lure lands in the water, the fisherman moves the lure to attract fish. This motion is caused by either reeling in the lure through the cranking of a handle attached to the reel, by moving the rod from side to side thereby causing the lure to travel from side to side, or both.

The game player operates the present electronic game controller in essentially the same fashion as if actually fishing. The electronic game controller consists of a rod and a reel attached to the rod. The reel does not contain fishing line, however, but instead contains the electronic circuitry necessary to control the game being played. Because the electronics are contained entirely within the reel, the game controller appears to be identical to a the rod and reel used in a real fishing excursion. The rod is, however, shorter than a real rod to avoid unnecessary expense inherent in a full sized rod and in order to allow a game player to play the game indoors in a confined area.

Externally, the reel appears quite similar to an actual reel. A casting button is included on the reel and performs a similar function to the function of a casting button on an actual reel. Two buttons in addition to those present on an angler's rod and reel are provided. In the present embodiment, the additional buttons are located just above and to either side of the casting button. These two buttons are a start button and an up-down control button, both which will be explained later in more detail.

A circuit board is contained in the reel for interfacing the control functions necessary to mimic an actual fishing excursion with a game controller. A plurality of position sensing switches, such as mercury switches, are mounted on the circuit board and are coupled to control circuitry also mounted thereon. The position sensing switches are used to sense the position of the rod and reel controller during game play and to provide electrical signals necessary to operate the game. The mercury switches are placed on the circuit board in specific locations so that the game controller can sense the position of the fishing rod as the rod is moved in various directions by the game player. The control circuitry responds to the signals generated by the position switches and converts the signals to other signals recognizable by the game machine.

The reel also includes a crank corresponding to the crank on an actual reel. Like the actual reel, the crank is used to move the lure once the lure has been cast from the reel. The crank is attached to a disk mounted inside the reel. The disk contains a series of spaced holes which pass between an optical source and optical sensor or optical switch. The optical sensor senses the holes as they travel past the optical switch due to the action of the crank. Each time a hole is sensed, the optical switch is actuated thereby causing a signal to be generated which is used by the game just as if a fisherman were reeling in the lure or a catch.

As currently embodied, the game controller is comprised of an actual rod and reel which have been modified to accept the circuit board and the additional switches. This embodiment is, however, not critical to the invention, and other apparatus is contemplated for manufacture to minimize cost as long as the look and the feel of the game controller remains the same.

DETAILED DESCRIPTION OF THE PREFERRED EMBODIMENT

Figure 1:
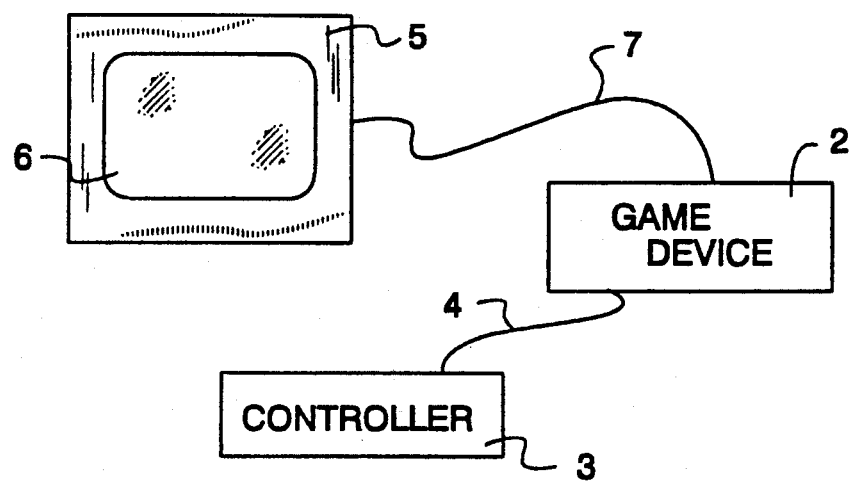
FIG. 1 illustrates an electronic game device, an electronic game controller and a video monitor.

FIG. 1 illustrates an arrangement for playing a video game with an electronic game device 2. The electronic game device 2 is connected to an electronic game controller 3 by a cable 4. The electronic game controller 3 controls the operation of the game device 2 when playing a video game displayed on a video monitor 5 or television set having a display screen 6. The game device 2 is connected to the video monitor 5 through a signal cable 7 which carries video information from the game device to the video monitor 5. To play a game, a rectangular box containing a game program is inserted into the game device 2. Once inserted, game play is started by operating control buttons on the game controller 3.

The present invention is an electronic game controller which replaces the previously described game controller 3 when the game device is a NES-001 by Nintendo, which is running a fishing game entitled "The Black Bass" by HOT-B U.S.A. Inc. which is provided in a rectangular box as discussed above. The present invention is a new controller which permits fishing-like motions to control the game running on the game device 2. The present invention uses the interface and protocol between the new controller and game device 2, as is used between the manufacturer's controller and game device.

Figure 2:
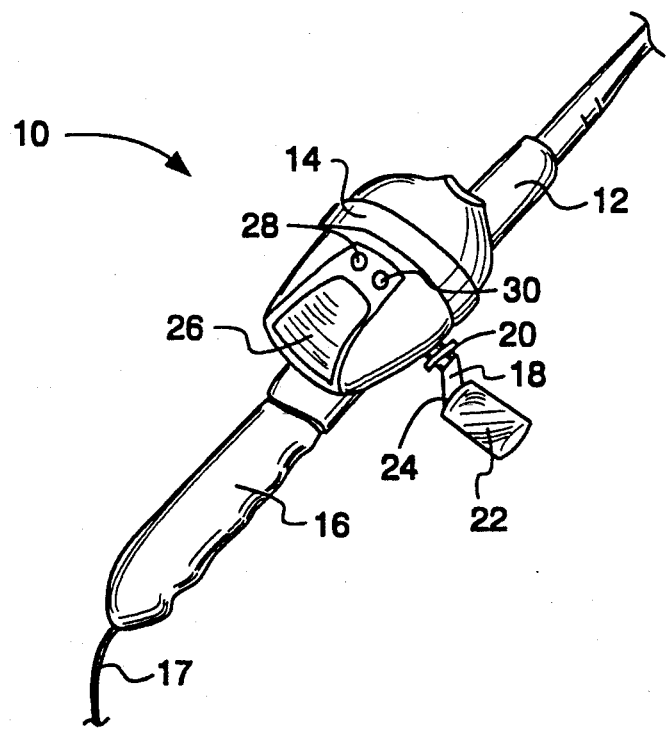
FIG. 2 illustrates a perspective view of the electronic game controller.

FIG. 2 is a perspective view of an electronic game controller 10 of the present invention. The game controller 10 is designed to look like an actual rod and reel and to function like a rod and reel under realistic fishing conditions. The electronic game controller 10 is designed to respond to movements of a game player which mimic realistic fishing movements designed to catch a fish. These movements include casting the lure, reeling in the line once cast, and invitingly presenting the lure to a waiting fish by causing the lure to move from side to side. The electronic game controller is designed to be interchangeable with the prior art game controller previously described.

The game controller 10 includes a rod 12 and an attached reel 14. It is within the scope of the invention to make the rod and the reel of a one-piece molded part. The rod 12 of the game controller 10 can be of any length but should include a handle 16 for grasping. A cable 17 connects the game controller 10 to the game device 2. A crank 18 is attached to the reel 14 and rotates about a pin 20. The crank 18 includes a crank handle 22 which can either rotate about a rotation point 24 or can be fixed in position.

The reel 14 includes a casting button 26 which corresponds to the casting button on an authentic reel. Two additional buttons, an up/down control button 28 and a start button 30 are located above and to either side of the casting button 26. The casting button 26, the up/down control button 28, and the start button 30 respond only to direct contact pressure from the game player.

Figure 3A:
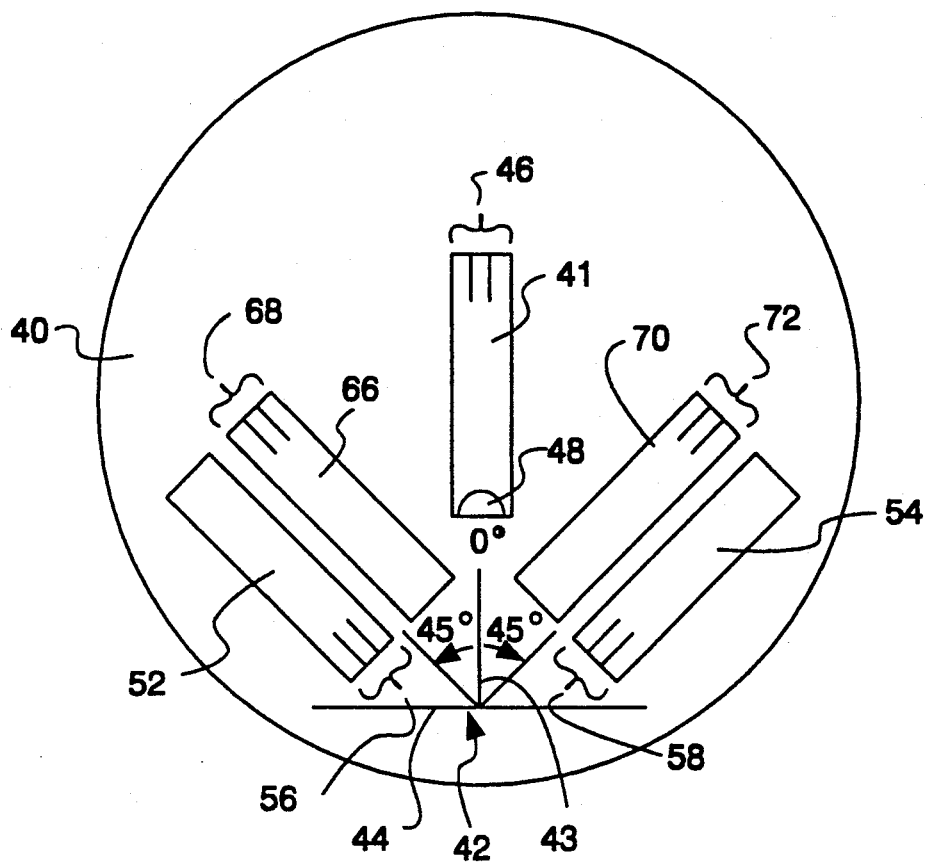
FIG. 3A is a diagrammatic representation of the position of mercury switches with respect to a circuit board containing the electronics of the game controller.

FIG. 3A is a diagrammatic representation showing the location of a plurality of position sensing switches on a circuit board 40. The position sensing switches are not accessible to direct contact by the game player, but respond to the physical position of the game controller. The circuit board 40 is disposed inside the reel 14 so that the surface of the board is substantially perpendicular to the longitudinal axis or centerline of the rod 12. As seen, the circuit board 40 is disc-shaped so that the board 40 can be mounted inside the reel 14. Other shapes can also be used. The board is oriented so that the longitudinal axis of a switch 41 is substantially vertical when the rod 12 is held normally in a horizontal position. By orienting the board in this position, the position sensing switches indicate the position of the reel 14 with respect to horizontal.

A first position sensing switch or mercury switch 41 is positioned with respect to the circuit board 40 as shown in FIG. 3A. A reference coordinate system 42 has been drawn on FIG. 3A to aid understanding of its function. The first mercury switch 41 is positioned flat against the circuit board 40 along a vertical reference line 43 marked 0 degrees and perpendicular to a horizontal reference line 44 corresponding to the position of rod 12 and reel 14 when held in a horizontal position. The first mercury switch 41 includes a pair of contacts 46. The contacts 46 are closed when a drop of mercury 48 within switch 41 makes contact with both of the contacts 46.

Figure 3B:
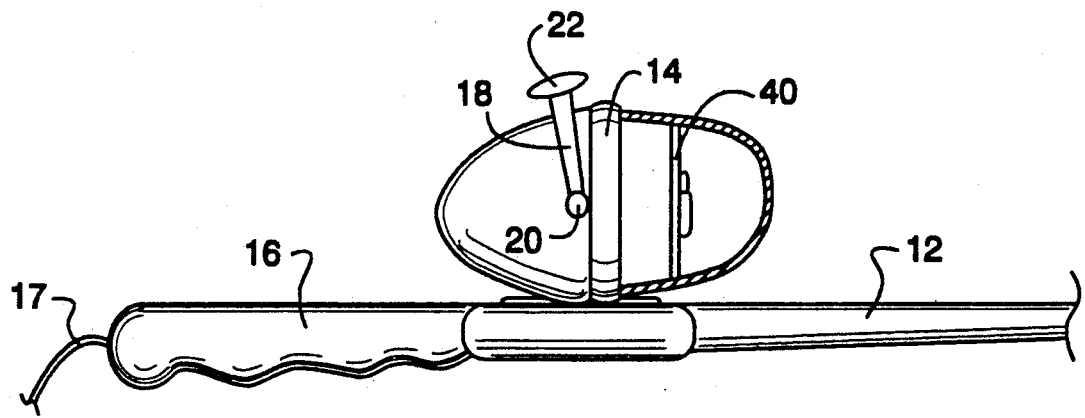
FIG. 3B illustrates the position of the circuit board within the reel.

FIG. 3B illustrates the position of the circuit board 40 within the reel 14. The front portion of the reel is cut away to reveal the position of the circuit board 40. As shown, the circuit board 40 is perpendicular to the longitudinal axis of the rod 12.

Figure 4:
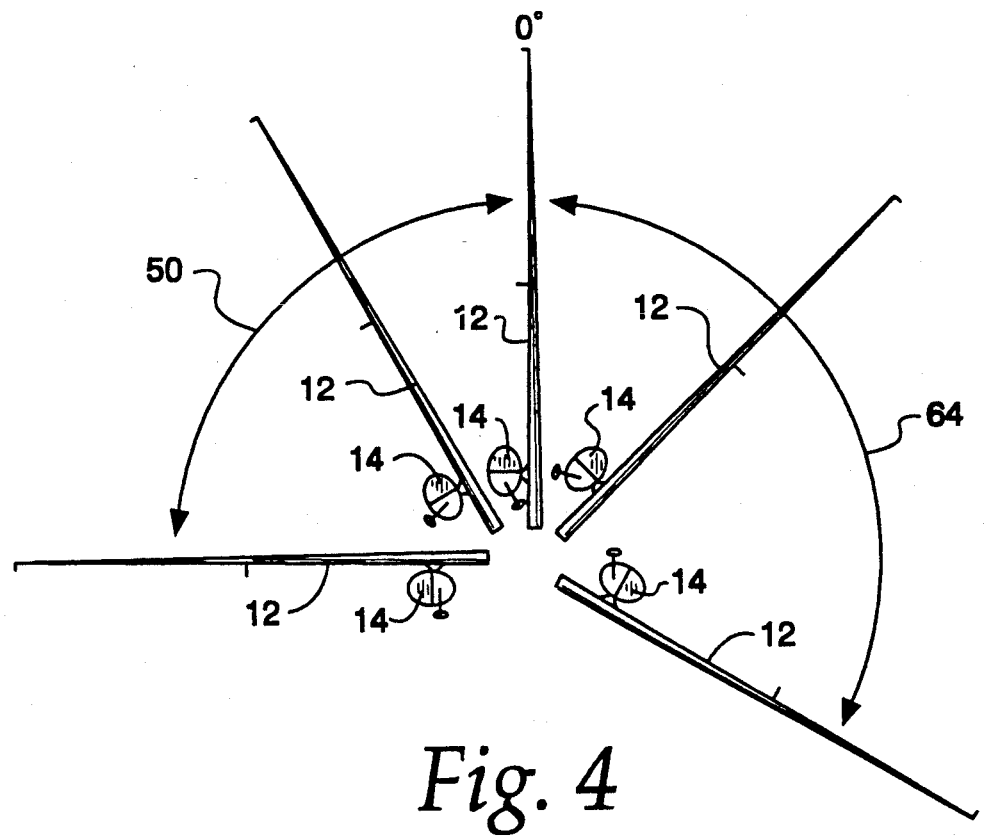
FIG. 4 illustrates the movement of a rod and reel during a casting motion and in what position certain mercury switches are activated.

FIG. 4 illustrates the rod 12 and reel 14 in a plurality of positions during a casting operation. The casting operation includes a first zone 50 (denoted by a lined arrow) or a first-casting position in which the first mercury switch 41 is closed. This zone corresponds to a rod position which begins at a point of 0 degrees, as shown, which is perpendicular to horizontal and continues in a direction back and away from the 0 degree line to a position approximately 90 degrees from the 0 degree line as shown, just as in a real casting motion. When the rod 12 and reel 14 are positioned within the first zone 50, the first mercury switch 41 is closed, indicating that a cast motion is beginning.

A second mercury switch 52 and a third mercury switch 54 are also mounted flat against the circuit board 40 as seen in FIG. 3A. The second mercury switch 52 includes a pair of contacts 56 located towards the bottom of the circuit board 40. The third mercury switch 54 also includes a pair of contacts 58 located towards the bottom of the circuit board 40. Each of the second and third mercury switches includes a small drop of mercury as previously described (not shown). The second and third mercury switches 52 and 54 are closed when the rod and reel are positioned in a second zone 64 (denoted by a lined arrow) or second casting position corresponding to the forward motion during a cast as illustrated in FIG. 4.

The second and third mercury switches 52 and 54 are mounted approximately 45 degrees from the 0 degree reference line 43 as shown in FIG. 3A. The second and third mercury switches 52 and 54 are offset from the 0 degree line by approximately 45 degrees to enable the switches to be closed even when rod motion is not perfectly straight up and down.

A fourth mercury switch 66 having a pair of contacts 68 and a fifth mercury switch 70 having a pair of contacts 72 are also mounted on the circuit board 40 as shown in FIG. 3A. The fourth and fifth mercury switches 66 and 70 are mounted approximately 45 degrees from the 0 degree reference line 43 as shown. Of course, this offset from the centerline of 0 degrees as well as the offset of the second and third mercury switches 52 and 54 can be adjusted to other angles depending on the designer's choice. The mercury switches 66 and 70 are positioned on the circuit board 40 so that the pair of contacts 68 and 72 are located towards the top of the board which is opposite the position of the contacts for the second and third mercury switches 52 and 54. The contacts are located in this position so that a left and right position of the rod can be sensed as shown in FIG. 5.

Figure 5:
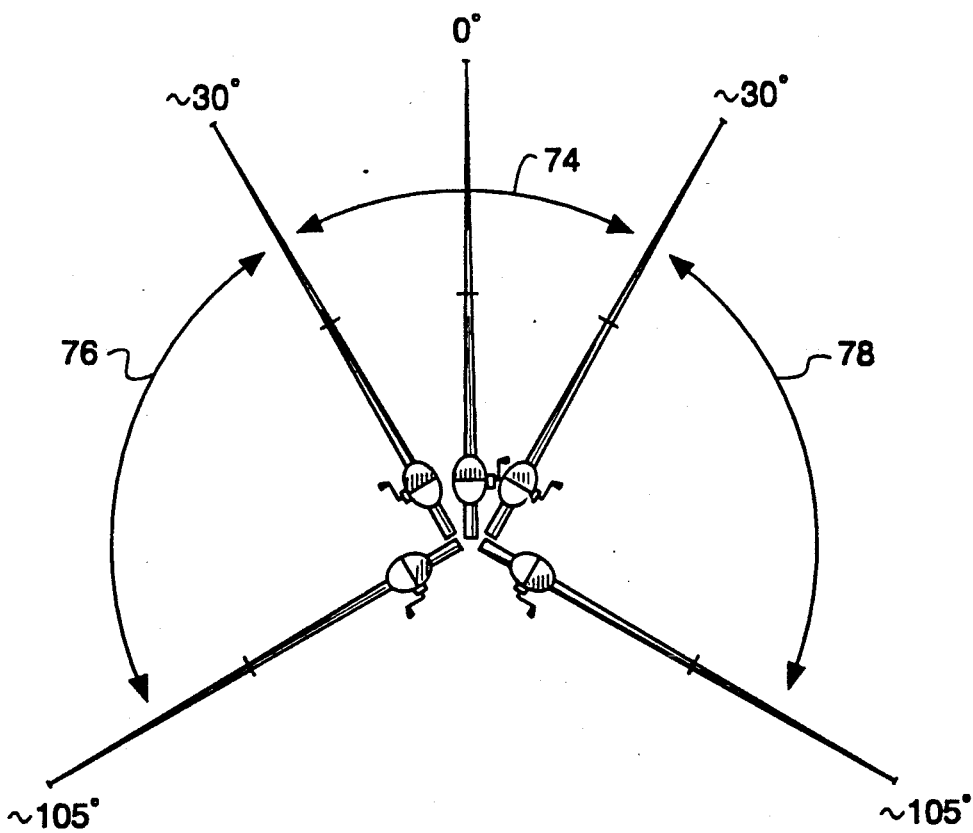
FIG. 5 illustrates the movement of the rod and reel during lure play and in what positions certain mercury switches are activated.

FIG. 5 illustrates the various positions of the rod 12 and reel 14 as moved from side to side or left to right and vice versa from a 0 degree line as illustrated. When the rod 12 is held along the 0 degree line or tilted from side to side no more than approximately 30 degrees in a third zone 74 (denoted by the lined arrow), the second and third mercury switches 52 and 54 are closed since the small drop of mercury contained therein will be located at the bottom of the glass tubes comprising each of the mercury switches 52 and 54. A fourth zone 76 (denoted by the lined arrow) illustrates the area where the fourth mercury switch 66 will be closed and the second mercury switch 52 will be open, which extends from approximately 30 degrees to 105 degrees to the left of the 0 degree line. The fourth zone 76 illustrates the area where a game player holds the rod and reel to make the lure travel to the left. A fifth zone 78 illustrates the area where a game player holds the rod and reel to make the lure travel to the right. In the fifth zone 78, the fifth mercury switch 70 will be closed and the third mercury switch 54 will be open.

Each of the aforementioned switches is used to sense the orientation of the electronic game controller with respect to the earth's center of gravity. The mercury switches are coupled to electronic circuitry which recognizes the opening and closing of the mercury switches and generates signals for controlling the operation of the game being played. The electronic circuitry can either be mounted on the circuit board 40 or on a separate board.

Figure 6:
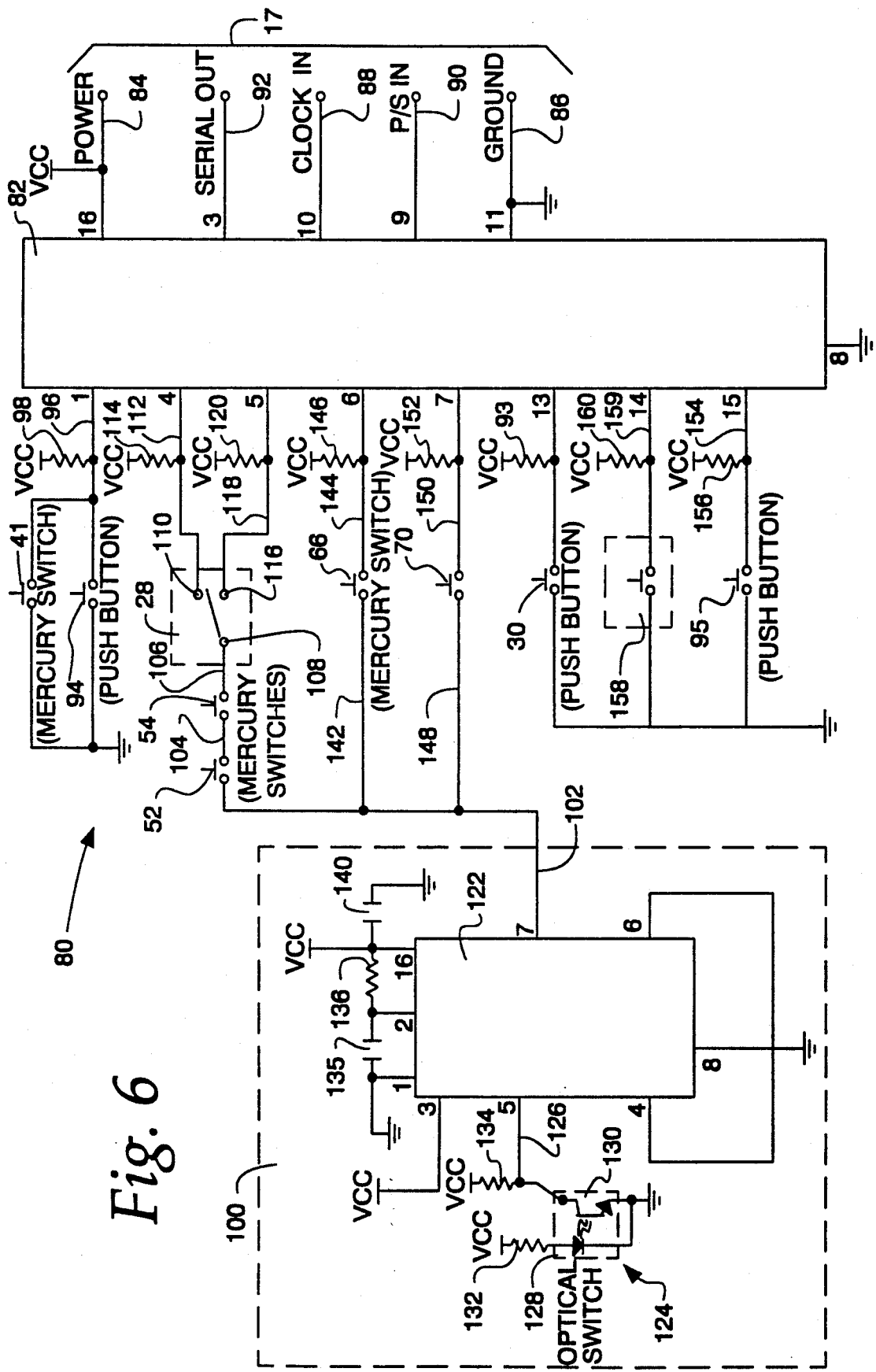
FIG. 6 is a circuit diagram of the present invention.

FIG. 6 illustrates a schematic diagram showing the electronic circuitry 80 of the present invention. The electronic circuitry 80 of the present invention is connected to the game device through the cable 17 containing five conductors. In the preferred embodiment the game device, which is not specifically shown herein, is the NES-001 by Nintendo, running the fishing game entitled "The Black Bass" by HOT-B U.S.A. Inc. The cable 17 connects the game controller to an interface integrated circuit (IC) 82 for interfacing between the game device and a plurality of switches including the mercury switches previously described. The interface IC 82 is a parallel to serial data converter which provides for the sensing of eight inputs. The present embodiment uses a CMOS IC, MC14021, manufactured by Motorola, Inc. The interface IC 82 senses eight inputs on the left hand side of the IC as illustrated and is coupled to the game device on the right hand side through the five conductors of the cable 17.

The interface IC 82 receives power from the game device though a conductor 84 which is connected to pin 16 of the IC 82. This is a positive supply voltage of typically 5 volts. The input voltage line is also labeled Vcc and the voltage obtained at this point is used to supply power to the rest of the circuitry as labeled. The interface IC 82 is also grounded to the game device at a conductor 86 coupled to pin 11 and pin 8 is also grounded.

A clocking signal is received from the game device on a conductor 88 at pin 10. The clocking signal is necessary for operation of the game as is well known to those skilled in the art. In addition, the IC 82 is coupled to the game controller through a conductor 90 at pin 9. The IC 82 receives a P/S In signal on pin 9 from the game player. The P/S In signal, in addition to the clocking signal at pin 10, are required to strobe the IC 82 to allow sensing of the inputs (pins 1-8) to develop a serial output signal at pin 3 of the IC 82, as is understood by those skilled in the art. The IC 82 also is coupled to the game device through a conductor 92 at pin 3. The conductor 92 carries a control signal to the game device which controls the play of the game. The signal carried is a serial stream of information whose content is determined based on the state of the switches in the game controller 10.

The interface IC 82 recognizes the states of the switches in the electronic game controller 10 and converts those states to the serial output signal on the conductor 92 for the game device. To begin game play, the start button 30 is depressed. The start button 30 has one input connected to ground and the other input connected to Vcc through a pullup resistor 93 and to pin 13 of the interface IC 82. The value of the pullup resistor is 7.5 Kohms in the present embodiment. This button corresponds to the start button on the prior art controller previously described. After the start button has been pressed, the game player selects a menu containing various options to be selected before game play can begin, such as select lure, move boat, cast, and end the game. To select the menu, the game player presses the cast button 26 to a first position. Once pressed to the first position, the cast button 26 mechanically activates an A pushbutton 94 located underneath the cast button 26. The A pushbutton 94 corresponds to the A button on the prior art controller. In a second position, a B pushbutton 95, also located underneath the cast button 26 is depressed, in addition to the A pushbutton 94. The function of the B pushbutton will be described later, as its use appears in the sequence of events during game play.

The A pushbutton 94 is a normally open pushbutton switch which has two positions in which the pushbutton is normally open. The A pushbutton 94 is coupled on one side to an input pin 1 of the IC 82 through a conductor 96 and on the other side to ground. Pin 1 is also coupled to Vcc through a pullup resistor 98 for supplying a positive voltage to the pin 1. The value of the pullup resistor 98 is 7.5 Kohms in the present embodiment.

Once the A pushbutton 94 has been depressed, a menu including a cursor for selecting different options appears on the video screen. To select one of the options by moving up the menu, the crank 18 is turned while the rod is held in an upright position When the crank is turned, a pulsing circuit 100 generates a pulse having a positive amplitude and pulse length of a predetermined period of time. The pulsing circuit 100 is coupled through a conductor 102 to three switches connected in series, the second mercury switch 52, the third mercury switch 54 and the up/down control switch 28, which comprise the up-down function seen in the prior art game controller.

The output of the pulsing circuit 100 is connected by conductor 102 to one contact of the second mercury switch 52. The other contact of the second mercury switch 52 is connected through a conductor 104 to one of the contacts of the third mercury switch 54. The other contact of the third mercury switch 54 is connected through a conductor 106 to a single pole contact 108 of a single pole-double throw switch comprising the up-down control button 28. A first contact 110 of the up-down control button 28 is coupled through a conductor 112 to pin 4 of the interface IC 82. Pin 4 is also coupled to Vcc through a pullup resistor 114 for supplying a positive voltage to pin 4. The present value of this pullup resistor 114 is 7.5 Kohms. A second contact 116 of the up-down control button 28 is coupled through a conductor 118 to pin 5 of the interface IC 82. Pin 5 is also coupled to Vcc through a pullup resistor 120 for supplying a positive voltage to pin 5. The present value of this pullup resistor is 7.5 Kohms.

To move the cursor up the menu, the crank 18 is turned while the rod is in the upright position, which closes the second and third mercury switches 52 and 54. Each time a pulse is generated by the pulse circuit 100 in response to the crank, the cursor moves up one selection in the menu. The generated pulse received at pin 4 of the interface IC 82 when both mercury switches 52 and 54 are closed and the up-down control switch 28 is connected to the first contact 110.

To move the cursor down the menu, the crank 18 is turned while the rod is in the upright position as before, but now the up-down control button 28 is depressed, thereby connecting the conductor 102 to pin 5 of the interface IC 82 since the second contact 116 is now connected to the single pole contact 108.

As previously stated, turning the crank causes the pulsing circuit 100 to generate a pulse on the conductor 102. To generate the pulse, the pulsing circuit 100 includes a one-shot multivibrator or one-shot timer integrated circuit 122. The one-shot IC 122 is a one-shot timer having the part number MC14538 and is manufactured by Motorola, Inc. The one-shot timer IC 122 is connected to Vcc at pin 3 and pin 16 and is connected to ground at pin 8. In addition, pins 4 and 6 are tied together as is understood by those skilled in the art.

The one-shot timer IC 122 generates a pulse on the conductor 102 connected to pin 7 of the IC 122 in response to an input to pin 5 of the IC 122. Pin 5 receives an input from an optical switch 124 through a conductor 126. The optical switch 124 is comprised of an optical source 128 and an optical sensor 130. One side of the optical source 128 is coupled to Vcc through a resistor 132 and the other side is coupled to ground. In addition, one side of the optical sensor 130 is coupled to Vcc through a resistor 134 and the other side is coupled to ground. In the present embodiment, the value of resistor 132 is 470 ohms and the valve of resistor 134 is 10 Kohms.

The crank 18 is connected to a rotatable opaque disk (not shown) which is contained within the reel 14. The disk is positioned in the reel 14 so that as it rotates its outer periphery passes between the optical source 128 and the optical sensor 130. The disk includes a number of holes spaced around the periphery of the disk. The crank 18, the disk, and the optical switch 124 combine to convert the rotational motion generated by the game player into the control signal generated at pin 7 of the timer IC 122. Each time one of the holes passes between the optical source 128 and the optical sensor 130, the optical switch 124 is closed due to the light received by the optical sensor 130 from the optical source 128. Each time the optical 124 switch closes, a pulse is generated at pin 7 on the conductor 102. It is within the scope of the invention to use a mechanical switch, Hall effect devices, or other equivalents as would be understood by those skilled in the art.

The duration of the pulse is determined by the values of a resistor 136 and a capacitor 138. One end of the resistor 136 is connected to Vcc and to pin 16 of the IC 82. The other end of the resistor 136 is connected to one side of the capacitor 138 and to pin 2 of the pulsing IC 122. The other side of the capacitor 138 is coupled to pin 1 of the IC 122 and to ground. As currently embodied, the value of the resistor 136 is 180 Kohms and the value of the capacitor 138 is 1 microfarad which establish the pulse width at approximately 180 milliseconds. The optical switch 124 must cycle from open to closed in order to activate the timer IC 122. One end of a capacitor 140 is coupled to Vcc and to the resistor 136 for filtering purposes as would be understood by one skilled in the art. The other end of the capacitor 140 is connected to ground. Other values of these components may be chosen to vary the duration of the pulse as is understood by those skilled in the art.

Each time a hole passes the optical source 128, a pulse is generated on the conductor 102. Each pulse causes the cursor to move one position on the menu. Once the cursor is adjacent to the selected item, pushing the cast button 26 to the first position completes the selection.

Typically, the game player first selects from the menu the option of moving the boat to locate a fish. To move the boat, the game player cranks the handle and adjusts the position of the rod and reel to determine direction. For instance, to move the boat forward, the game player holds the rod in the upright position and cranks the handle. As previously described, holding the rod in the upright position closes the second switch 52 and the third switch 54. By turning the crank 18, the IC 82 receives input signals at pin 4 on conductor 112. The IC 82, in response, generates a signal on pin 3 which causes the game device to move the boat forward. Likewise, to move the boat in the opposite direction, the crank 18 is turned at the same time the up-down control button 28 is depressed. Now the pulse generated on the conductor 102 is received by the interface IC 82 at pin 5. Again, the interface IC 82 converts this signal into one recognizable by the game device received over the serial out conductor 92 at pin 3.

The boat can also be moved from left to right. To move the boat to the left, the rod and reel are moved to the left, as previously described, to the area 76 as shown in FIG. 5. In this position, the fourth mercury switch 66 is closed. One side of the fourth mercury switch 66 is connected to the conductor 102 through a conductor 142 and the other side of the switch 66 is connected to pin 6 of the interface IC 82 through a conductor 144. The conductor 144 is also connected to Vcc through a pullup resistor 146. The value of the pullup resistor 146 is 7.5 Kohms. Turning the crank 18 while in the left position, sends the pulse signal from the pulsing circuit 100 to pin 6 of the interface IC 82. The interface IC 82 converts this signal into one recognizable by the game device to cause the boat to move to the left.

Likewise to move the boat to the right, the rod and reel are moved to the right, as previously described, to the area 78 of FIG. 5. In this position, the fifth mercury switch 70 is closed. One side of the fifth mercury switch 70 is connected to the conductor 102 through a conductor 148 and the other side of the switch 70 is connected to pin 7 of the interface IC 82 through a conductor 150. The conductor 150 is also connected to Vcc through a pullup resistor 152. The value of the pullup resistor 152 is 7.5 Kohms. Turning the crank 18 while in the right position, connects the pulse signal of the pulsing circuit 100 to pin 7 of the interface IC 82. The interface IC 82 converts this signal into one recognizable by the game device to move the boat to the right.

Once the boat is positioned, the game player pushes the casting button 26 to the first position which actuates the A pushbutton 94 to begin the casting mode. Once in the casting mode, the rod is brought to the upright position of 0 degrees and into the zone 50 as shown in FIG. 4. In the zone 50, the first mercury switch 42 is closed. The first mercury switch 41 has one contact connected to ground and the other contact connected to the conductor 96. Closing the first mercury switch 41 takes pin 1 of the interface IC to ground through the conductor 96. The first mercury switch 41 is connected in parallel with the A pushbutton 94. A signal is generated at pin 3 of the IC 82 which causes the game device to begin the cast mode. As can be seen, the present invention includes a cast mode which closely resembles the actual art of casting a lure with a rod and reel.

Once the first mercury switch 41 is closed by bringing back the rod and reel, the rod and reel are then brought forward in the same fashion as if actually casting a bait or artificial lure. When the rod is brought forward into the zone 64 of FIG. 4, the first position sensing switch 41 will open. At the point of opening of the first position sensing switch 41, the casting button 26 is depressed to the first position to activate the A pushbutton 94. Closing the A pushbutton, casts the lure from the reel.

Once the lure has been cast, the game player can reel in the lure by holding the rod and reel in a normal fishing position and turning the crank 18. To work the lure to the left, the rod and reel are tilted to the left to close the fourth mercury switch 66 and at the same time turning the crank 18. To work the lure to the right, the rod and reel are tilted to the right to close the fifth mercury switch 70 and at the same time turning the crank 18. As can be seen, directing the travel of the lure utilizes the same technique as directing the travel of the boat as previously described. To pull the lure faster, the cast button is depressed to the first position, thereby closing the A pushbutton 94.

Once the cast has been made, the game player may decide that a new cast must be made due to the inaccuracy of the prior cast. In this case, the lure is retrieved by pressing the cast button 26 fully in to the second position. In the second position, both the A pushbutton 94 and the B pushbutton 95 are closed. As seen in FIG. 6, the B pushbutton 95 has one side connected to ground and the other side connected to a conductor 154 connected to pin 15 of the interface IC 82. The conductor 154 is also connected to Vcc through a resistor 156. The resistor has a value of 7.5 Kohms in the present embodiment.

Figure 7:
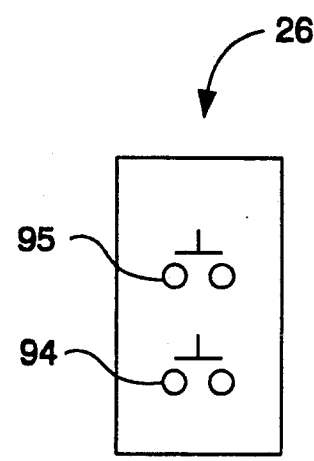
FIG. 7 illustrates the position of an A pushbutton and a B pushbutton located beneath the casting button.

FIG. 7 illustrates the positions of the A pushbutton 94 and the B pushbutton 95 as located under the cast button 26. Both the A pushbutton 94 and the B pushbutton 95 are located under the cast button 26 shown generally here as the rectangular outline surrounding both the switches. As previously described, the A pushbutton 94 is depressed when the cast button 26 is depressed to a first position. In this position, only the A pushbutton 94 is depressed. This is accomplished by positioning the A pushbutton 95 so that it is slightly elevated above the B pushbutton 95 so that, when the cast button 26 is depressed to the first position, only the A pushbutton 94 is closed. In the second position of the cast button 26, the cast button 26 is pushed further downward so that the cast button 26 contacts both the A pushbutton 94 and the B pushbutton 96, thereby closing both switches.

Once the fish has been hooked, the game player depresses the cast button 26 to the first position to close the A pushbutton 94. The cast button 26 is depressed to the first position until a bell rings. A ringing bell indicates that the tension on the line is too great and the line may break if the tension is not released. To release the tension, the cast button 26 is released until the bell stops ringing. At that time, the cast button 26 may be depressed again to continue pulling in the fish until landed.

The prior art game controller also includes a select button for selecting different games. The present invention does not include a select button, since only one game currently is played with this controller. If, however, additional games are developed to be used with the present game controller, a select button 158 could be included as shown in FIG. 6. The select button 158 is a pushbutton switch having one side connected to ground and the other side connected to pin 14 of the interface IC 82 through a conductor 159 and to Vcc through a pullup resistor 160 having a value of 7.5 Kohms. The select switch 158 is shown within a dotted box to indicate that it is not currently being used.

Thus, there has been described herein an electronic game controller for playing a fishing game. The electronic fishing game controller includes the necessary operator control buttons to operate the fishing game, but in a novel combination which offers the game player a realistic fishing experience not present in the prior art game controller.

The foregoing description of the invention has been presented for purposes of illustration and description. The electronic game controller has been described in combination with a typical sequence of game play to illustrate the operation of the controller. This description is not intended to limit the invention to the precise forms disclosed. For instance, the number of position sensing switches is not limited to five. One of the second or third mercury switches 52 and 54 could be eliminated and the remaining one placed in a vertical position like that of mercury switch 41 for sensing. Consequently, many modifications and variations are possible in light of the above teachings by those skilled in the art as expressed in the specification and the appended claims.

What is claimed is:

1. An electronic controller for controlling a fishing simulation video game comprising:
    a game player positionable means for responding to movements of a game player;
    a plurality of operator accessible control switch means mounted on said positionable means for generating first signals in response to direct physical contact by the same player;
    a plurality of position sensing means mounted on said positionable means for generating a second signals in response to the position of the positionable means;
    rotational switch means mounted on said positionable means for generating third signals in response to rotational motion generated by the game player; and
    an interface means for generating game device control signals in response to said first signals, said second signals and said third signals.

2. The electronic game controller of claim 1 wherein said plurality of position sensing means comprises a mercury switch means for sensing the position of the positionable means.

3. The electronic game controller of claim 1 wherein said positionable means resembles a fishing rod handle having a fishing reel housing attached thereto.

4. The electronic game controller of claim 2 wherein said mercury switch means includes a mounting means having a plurality of mercury switches attached thereto, said mounting means being disposed inside said positionable means.

5. The electronic game controller of claim 4 wherein a first mercury switch of said plurality of mercury switches is attached to said mounting means so that said first mercury switch is closed when the positionable means is in a first position.

6. The electronic game controller of claim 5 wherein said first position is a left position.

7. The electronic game controller of claim 5 wherein a second mercury switch of said plurality of mercury switches is attached to said mounting means so that said second mercury switch is closed when the positionable means is in a second position.

8. The electronic game controller of claim 7 wherein said second position is a right position.

9. The electronic game controller of claim 7 wherein a third mercury switch of said plurality of mercury switches is attached to said mounting means so that said third switch is closed when the positionable means is in a first casting position.

10. The electronic game controller of claim 9 wherein a fourth and a fifth mercury switch of said plurality of mercury switches are attached to said mounting means so that said fourth and said fifth mercury switches are closed when the positionable means is in a second casting position.

11. The electronic game controller of claim 1 wherein said rotational switch means includes;
    an optical switch having an optical sensor and an optical source spaced apart;
    a disk having a plurality of opaque sections and a plurality of transparent sections wherein rotation of the disk alternatingly places said opaque sections and said transparent sections between said optical sensor and said optical source;
    a crank coupled to said disk so that rotation of said crank causes said disk to rotate; and
    a timer means coupled to said optical switch for generating pulse signals in response to said optical switch.

12. An electronic game controller for controlling an electronic game device operating in accordance with a fishing simulation game, said electronic game controller comprising:
    interface means for generating an electronic game device control signal for controlling the electronic game device;
    rotational switch means for transmitting signals to said interface means representing rotational motion of said rotational switch means supplied by a game player;
    operator accessible control switch means for transmitting signals to said interface means representing direct physical contact by the game player; and
    position sensing means coupled to said interface means for sensing the position of said electronic game controller.

13. The electronic game controller of claim 12 wherein said position sensing means comprises at least one position sensing switch means, said at least one position sensing switch means includes a first position switch means for sensing a first casting position of the electronic game controller.

14. The electronic game controller of claim 13 wherein said at least one position sensing switch means includes a second position switch means for sensing a second position of the electronic game controller.

15. The electronic game controller of claim 14 wherein the second position is a second casting position.

16. The electronic game controller of claim 15, wherein said at least one position sensing switch means includes a third position switch means for sensing a left position of the electronic game controller.

17. The electronic game controller of claim 12 wherein said rotational switch means includes;

an optical switch having an optical sensor and an optical source spaced apart;

a rotatable disk having a plurality of holes along the periphery of said disk, said disk positioned with respect to said optical switch to position the periphery of the disk between said optical sensor and said optical source;

a crank coupled to said rotatable disk to cause said disk to rotate; and a timer means coupled to said optical switch for generating a pulse signal in response to the closing of said optical switch.

18. The electronic game controller of claim 12 wherein said rotational switch means is connected to said interface means through at least one position sensing switch means of said position sensing means.

* * * * *